UNITED STATES PATENT OFFICE.

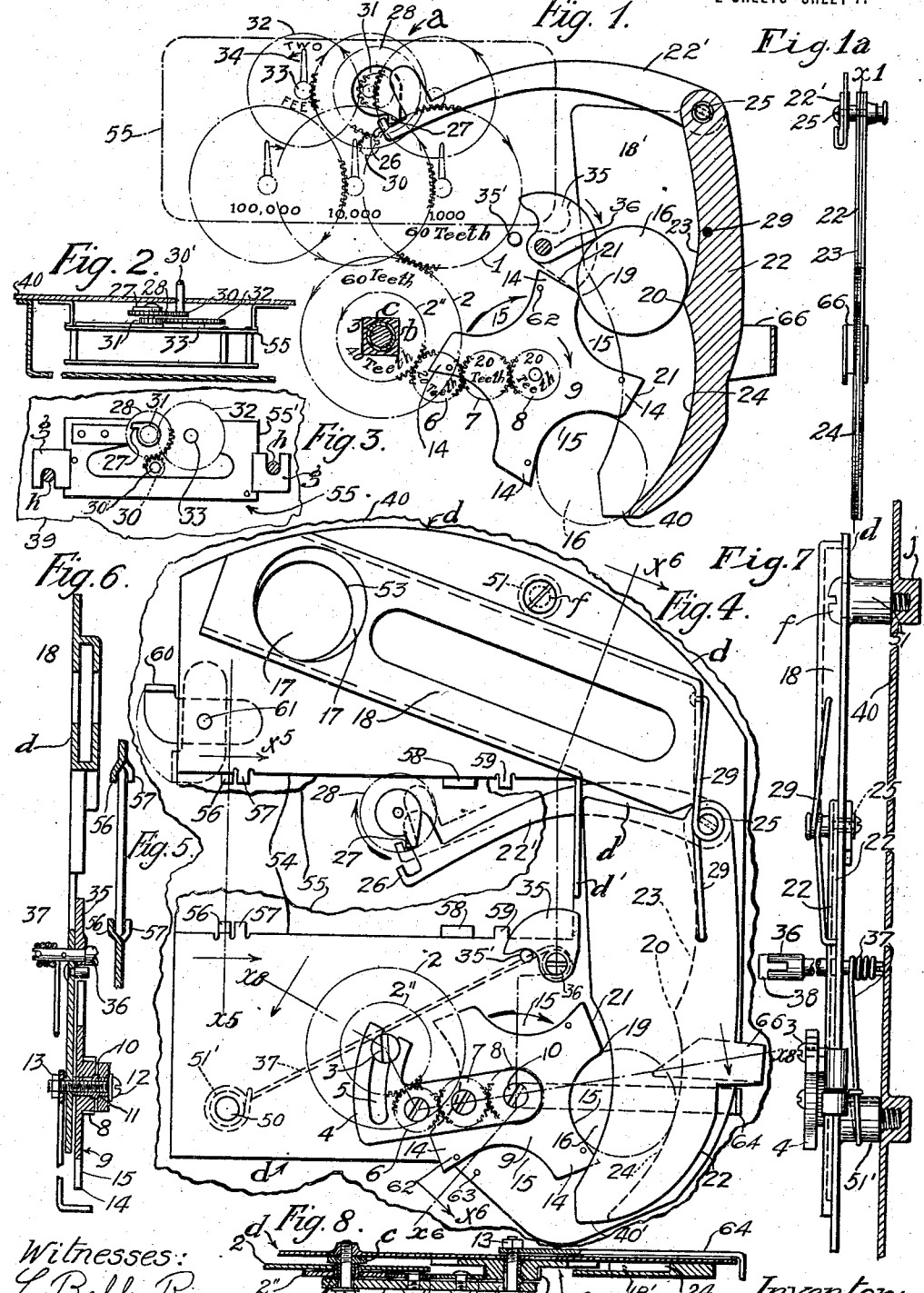

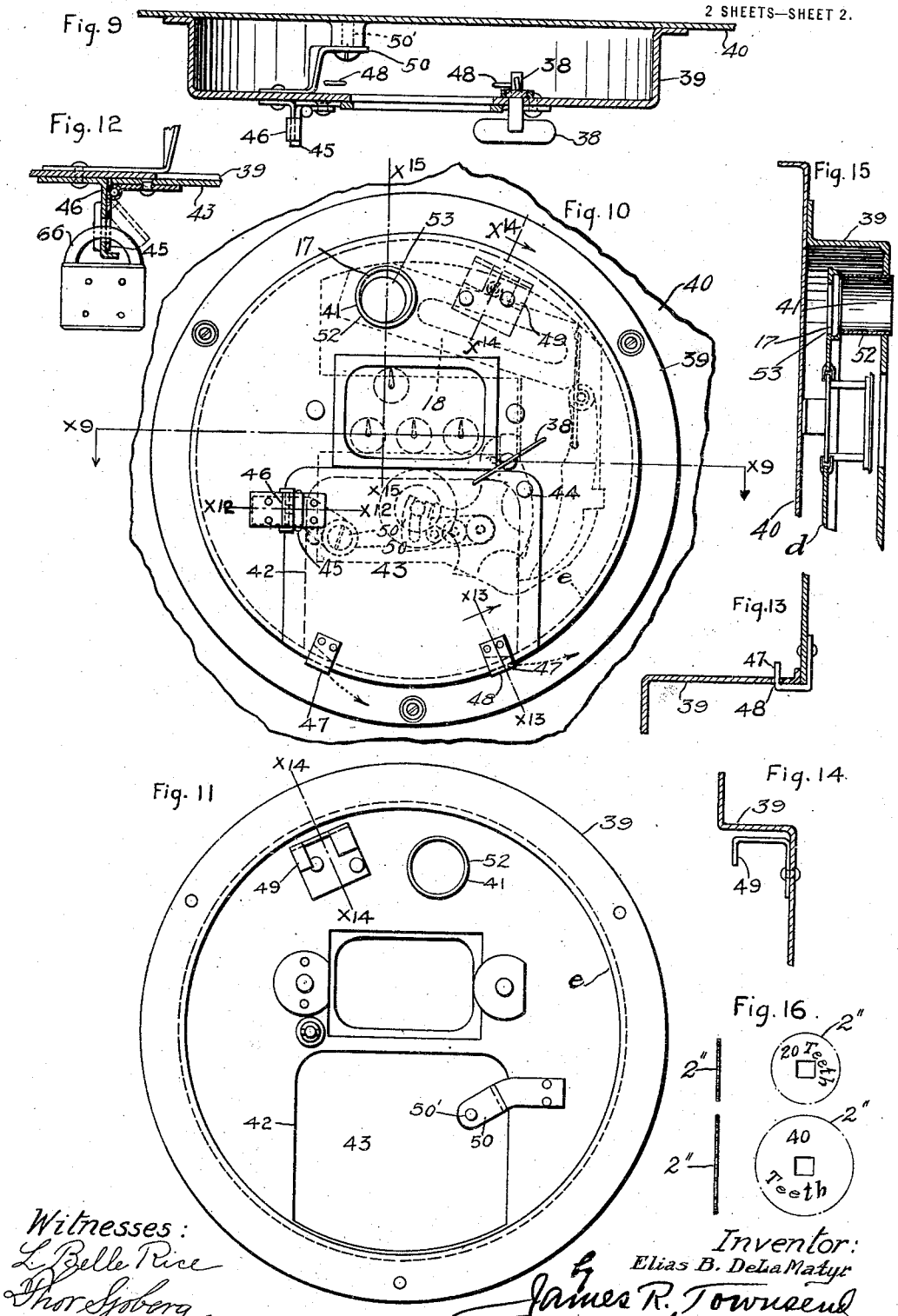

ELIAS B. DE LA MATYR, OF LOS ANGELES, CALIFORNIA.

PREPAYMENT ATTACHMENT FOR GAS-METERS.

1,186,891.  Specification of Letters Patent.  Patented June 13, 1916.

Application filed September 23, 1912. Serial No. 721,967.

*To all whom it may concern:*

Be it known that I, ELIAS B. DE LA MATYR, a citizen of the United States, residing at Los Angeles, in the county of Los Angeles and State of California, have invented a new and useful Prepaying Attachment for Gas-Meters, of which the following is a specification.

An object of the invention is to provide a cheap and simple apparatus that is not liable to get out of order and that can be applied to gas meters without the use of stuffing boxes and without any liability of leakage from the meter.

Another object of the invention is to provide a prepaying apparatus which can be readily changed to measure the various quantities which may be prepaid under varying prices with the same coin.

In the United States charges for gas to consumers are usually rated at so much per thousand cubic feet and the prices per thousand cubic feet are made to vary by the sum of five cents or some multiple thereof. Consequently five is a divisor of the rate and also of the amount of gas in the unit of measurement to which the rate is applied. The coins of the United States from five cents up are also in denominations of five so that prepayments in coin-controlled meters are made in one-twentieth part of a dollar or some multiple thereof.

In carrying out this invention it is deemed most desirable to illustrate it as constructed to be operated by quarter dollars so that if gas were sold at one dollar per thousand cubic feet, four quarters would operate the releasing mechanism so as to deliver one thousand cubic feet. All variations from such price may then be made by supplying such gearing as may be necessary to accommodate the ratio between the unit of measurement and the price per unit.

An object of this invention is to provide simple and convenient means whereby the proper ratio may be maintained when the price is changed.

An object of the invention is to provide means whereby a gas meter can be made to serve as a prepay or a non-prepay gas meter at will by simply attaching to or removing from the meter a prepaying device.

So far as I am aware, there has never heretofore been produced any attachment that can be applied to and removed from the meter thus to change a non-prepaying meter already installed to a prepaying meter. I therefore regard this invention as pioneer in the art in various features which will hereinafter be more fully described.

A further object of the invention is to so construct the attachment that the gas will be immediately cut off when the meter has registered the amount of gas for which payment has been made, so that the user will get full benefit and a full strong light from all the gas for which he pays.

Other objects and advantages may appear from the subjoined detail description.

The accompanying drawings illustrate the invention.

Figure 1 is a front elevation mainly diagrammatic with the bell crank latch partly in section on line $x^1$, Fig. 1$^a$, of the invention as applied to the dial mechanism of a meter. The parts are in the meter-stopping coin-intercepting position. Fig. 1$^a$ is an elevation of the bell crank latch detached and viewed from the left in Fig. 1. Fig. 2 is a reduced broken plan showing the index frame fixed to a fragment of the meter case, which is shown in section; also the two-feet indicator and the shaft and gear wheels which transmit motion from the meter mechanism to the two-feet indicator shaft. Most of the dial movement is omitted. Fig. 3 is a fragmental rear elevation of the parts shown in Fig. 2, the index driving shaft and pinion being indicated in dotted lines. Fig. 4 is a front elevation of the prepaying meter attachment shown in Fig. 1, the parts being in gas-supplying position. Fig. 5 is a fragmental view of a portion of the attachment frame seen from line $x^5$, Fig. 4. Fig. 6 is a sectional elevation on irregular line indicated by $x^6$—$x^6$, Fig. 4, looking to the right in the direction of the arrows. Fig. 7 is an edge view from the right of Fig. 4. Fig. 8 is a plan section on irregular line indicated by $x^8$—$x^8$, Fig. 4. Fig. 9 is a plan section on irregular line indicated by $x^9$—$x^9$, Fig. 10, omitting the meter case and internal mechanism. Fig. 10 is a broken elevation of a gas meter with prepay attachment and cover in place. Fig. 11 is a rear elevation of the cover detached. Fig. 12 is an enlarged sectional detail on line indicated by $x^{12}$, Fig. 10; the position of the hinged clasp when swung back is indicated in dotted lines. Fig. 13 is an enlarged sectional detail on line indicated by $x^{13}$, Fig. 10. Fig. 14 is an enlarged sectional detail on line indicated by $x^{14}$, Figs. 10 and 11. Fig. 15 is a fragmental section of the cover, the meter and the coin chute on line $x^{15}$, Fig. 10. Fig. 16 is a diagrammatic side and edge view of a number of elements forming part of a set of interchangeable rate gears.

A characteristic feature of the invention is the provision of prepaying mechanism adapted for gas meters and arranged to be directly operated by the well-known gas meter index mechanism, it being provided with mechanism that normally locks the index mechanism of the meter and that is mechanically released from the locking position by the introduction of the prepaying coin and the subsequent operation of the starting mechanism which moves the coin into its proper position and opens the way to allow the index mechanism and the meter mechanism to run, thereby allowing gas to flow through the meter.

The gas meter index mechanism may be of any preferred construction common to gas meter index mechanism and is shown as the usual train $a$ of index wheels, from which the power for actuating the prepaying mechanism is derived preferably through the 1000-wheel 1, for the reason that prepayment of gas is normally made by the 1000 cubic feet and for this reason a double gear adjustable rate wheel comprising the main rate gear 2 and detachable rate changing gear 2″ is provided, the detachable gear being one of a set of interchangeable gears having different numbers of teeth to change the rate in the manner common in the art; and the main rate gear 2 being in mesh with the 1000-wheel 1 and like it having sixty teeth. Said gears are journaled to turn on a common axis the detachable gear 2″ being made non-rotatable relative to the main rate gear 2 by any suitable means, as the externally square sleeve $b$, so that both gears turn together, the sleeve $b$ being journaled on a flanged bushing $c$ supported by a screw 3 screwed into the frame plate $d$.

A radius arm 4 provided with a segmental slot 5, to accommodate the screw 3 and carrying a train of gear wheels 6, 7, the former meshing with the rate changing gear 2″ and the latter meshing with the gear 8 which is fixed to and drives the coin-carrying wheel 9, is journaled on the frame $d$ by a stepped internally threaded tubular shaft 10 having a collar 11 to support the radius arm and retain the gear 8 and coin wheel 9 which are fixed together and are journaled coaxially of the radius arm on the shaft 10 that is held in place on the frame $d$ by the screw and nut 12, 13, or the like, said screw screwing axially through the shaft which serves as the axis for the radius arm, the gear 8 and coin wheel 9.

The coin-carrying wheel 9 is provided with arms 14, forming therebetween semi-circular coin seats 15, there being in this instance, four of such seats each adapted to fit the circular edge of the latch releasing coin 16 which in the drawing is shown the size of a United States twenty-five cent piece, and which after its insertion in the chute inlet 17 passes down the coin chute 18, and its continuation 18′ until it is intercepted as in Fig. 1 by a pair of coin-supporting contacts 19, 20, the contact 19 being a point formed on the coin-carrying wheel 9 at the junctures of the coin seats 15 and the inclined peripheral edges 21 of the wheel arms 14; and the contact 20 formed substantially opposite to and on a level with the contact 19 at normal rest position, by an intermediate raised point formed in an edge wall of a recess in one face of one limb 22 of a spring-controlled bell-crank latch there being a space between the detents forming a coin-way that is only capable of passing the coin when the detents are relatively moved apart from normal position. The coin limb 22 is a strip of metal or other suitable material somewhat thicker than the latch releasing coins for which the device is designed and preferably flat on the outer side and being recessed on the inner side; the recessed side being adjacent a flat side of the frame plate $d$ and the recess therein forming with said plate and a bent-up wing $d'$ thereof, a practically vertical downward continuation 18′ of the coin chute. One edge wall of said chute is formed with two curved recessed portions 23, 24 which produce at their junction the contact 20.

The latch bell-crank comprises the coin limb 22, latch limb 22′ and a rigid connection consisting of a shaft 25 fixed to said limbs and journaled to the frame so that the bell-crank is pivoted to the frame $d$ by the shaft 25. The limb 22′ is provided with a detent 26 which is normally held in position for engagement with a tooth 27 of the driving gear 28 by the action of the latch spring 29. The driving gear 28 meshes with and is driven by the meter movement pinion 30 that is driven by the meter mechanism, not shown, through the index shaft 30′ which is of the usual construction. The pinion 30 drives the index gear train $a$ through the driving gear 28, pinion 31 and gear wheel 32 mounted to rotate the shaft 33 of the unit indicator 34 which in one revolution registers a predetermined amount and in this instance registers two feet as in other meters of this character.

When the detent 26 engages the tooth 27 the meter cannot operate. The locking of the meter is thus accomplished at the most efficient point so that when the bell-crank latch is returned by the spring 29 the delivery of gas is practically stopped at once. The index movement is thus intermediate between the meter movement and the prepaying mechanism, so that motion from the meter is communicated directly to the index movement as hereinbefore set forth and the prepaying mechanism is actuated directly from the index movement.

Means are provided to force the coin 16 along the coin way between the contacts 19, 20 so as to turn the bell-crank 22, 22′ and retract the detent 26 from engagement with the tooth 27 thus to allow the meter to operate, and such means may comprise a coin-starting arm 35 which normally forms a part of one edge wall of the chute 18 and is pivoted to the frame $d$ by a pin 36 that is slotted at one end; and is adapted to be turned against the retracting tension of a coil spring 37 by means of a tongued key 38 that engages said slotted end; said key extending through the cover 39 of the attachment which is attachable to the head of the meter case 40. By turning the key 38 when engaged with said pin, the coin-starting arm 35 will be projected into the chute 18 so as to engage the edge of the coin 16 above the horizontal plane of the contacts 19, 20 and to exert pressure to force the coin to turn the bell-crank and allow the coin to enter the appropriate adjacent seat 15 of the coin-carrying wheel 9, at the same time the arm 35 thus acts through the coin as means for retracting the detent 26 and permitting running of the meter mechanism; which thereupon drives the coin-carrying wheel 9 to move the coin downward along the lower bell-crank recess 24, of which the edge is constructed substantially to an arc having its generating axis to coincide with the axis of the coin-carrying wheel shaft 10 and so spaced apart from the adjacent seat 15 as to make the coin-carrying wheel constitute means acting through the coin to hold the detent 26 retracted during a quarter revolution of the coin-carrying wheel which moves the actuating coin from end to end of the recess 24 and discharges the coin at the chute outlet 40′; whereupon, unless otherwise prevented, the bell-crank 22, 22′ will be returned to the coin-intercepting and meter-stopping position of Fig. 1 by the force of the spring 29; but in case another coin, not shown, has been inserted in the chute 18 before the coin 16 has been discharged from between the seat 15 and recess 24, said other coin will pass the coin-intercepting contacts 19, 20 before the first coin is discharged, and will then be in position to maintain the bell-crank 22, 22′ in the stop-disengaging position of Fig. 4.

It is thus seen that arm 35 not only moves the coin into the pocket 15 of the coin wheel, but in so doing moves the coin against shoulder 20 on arm 22 to thereby swing arm 22′ and release detent 26 from stop 27, the arm 35 thus acting through the coin releases the meter mechanism and brings the coin into position where the coin-wheel 9, by its rotation, acts through the coin 16 to operate the crank lever 22 and 22′ to hold the detent in its released position and to finally release the crank lever so that the detent may return to locking position.

It is thus seen that so long as there is at least one coin in the chute 18 in addition to the actuating coin 16, and the gas turned on, operation of the meter mechanism will be continuous and furthermore that the portion of the chute above the plane of the contacts 19, 20 forms in effect a coin-reservoir.

The cover 39 is provided with a circular coin-receiving orifice 41 adapted to communicate with the chute inlet 17 when the cover is in place on the frame.

Access may be had to the inside of the cover 39 to remove the actuating coins and furthermore to substitute a rate gear of a different size for the detachable rate gear 2″ whenever it is desired to change the rate; and for these purposes the meter cover is provided with a comparatively large hand hole 42 normally closed by a door 43 which is pivoted at one of its upper corners at 44 to the cover and is provided at its other upper corner with a perforated hinged clasp 45 that may be brought into registration with a perforated lug 46 of the cover for fastening as by a padlock 65. The door 43 is provided with a pair of hooked tongues 47 arranged near the two lower corners of the door and adapted to engage a pair of slots 48 when the door is closed. The pivot 44, clasp and lug 45, 46, and tongues and slots 47, 48 thus form fasteners at the four corners of the door 43, and when the clasp and lug are unlocked from each other the door may be swung on pivot 44 which is eccentric to the annular wall $e$ so that as the door is swung on the pivot 44, the hooked tongues are withdrawn from the annular wall, but when the door is closed and locked they engage the wall to prevent the door from being pried off.

The meter cover 39 is provided internally with a slotted bracket 49 and perforated bracket 50 between which the attachment frame $d$ may be caught. The attachment frame $d$ is provided with two hollow legs 51, 51′ to rest on the meter case 40 to which the frame $d$ is fixed by a screw $f$ passed through the frame $d$ and the leg 51 and screwed into the meter case 40 and into one of the bosses $j$ provided in the meter case to form solid closed seats for the screws that fasten various parts to the meter case.

In order to prevent anyone from tampering with the prepay mechanism by means of an instrument inserted through the coin chute, the cover is provided at the orifice with an inwardly projecting collar 52 resting against the outer wall of the coin chute, and registering with the true coin inlet 17 therein; said outer wall being provided with the chute inlet 17 that is large enough to admit a quarter; and the inner or rear wall of the chute inlet being provided with a false coin outlet 53 of less diameter than the true coin chute inlet and opening from the lower edge of said chute; so that any small coin, as a nickel, dime or penny, inserted into the chute intended for the larger coin will pass back through the false coin outlet and drop directly into the coin box without actuating the prepay mechanism.

The inwardly projecting collar is elongated so as to afford obstruction to manipulation of an instrument inserted therethrough into the coin chute. The starting key though attached to the cover is not attached to the starting stem and therefore does not interfere with the detaching of the cover when such detaching is desired. The attachment frame $d$ is provided with a slot 54 to slide onto the inner plate 55 of the index frame $d$ which is fixed in the usual way by means of two slotted legs $g$ and screws $h$ to the meter case 40. The sides of the slot 54 are provided with inwardly extending lugs 56, 57, 58, 59 standing in two separate planes to form a runway, and a latch 60 pivoted at 61 to the attachment frame, holds the attachment firmly on the index frame.

In installing the device for practical use it is necessary that the coin wheel 9 shall be adjusted to a position analogous to that shown in Fig. 1 when the bell crank is at rest and the coin wheel is in position to allow the required coin to be forced between the contacts 19 and 20 and into a coin seat 15; and for the purpose of readily determining the proper position, two pin holes 62, 63 provided respectively in the coin wheel 9 and the attachment frame $d$ will be brought into alinement, a pin, not shown, being inserted into said holes to determine such alinement at the time the rate wheels are put in place; and being withdrawn after the rate wheels have been placed and secured by the screw 3, and the transmission gear 6 has been meshed with the detachable rate wheel 2″.

There is liability that the bell crank 22 may be moved too far by the action of the arm 35 against the coin 16, and to avoid this, a stop 64 is fixed to the frame by the screw 10 and projects into the way of the bell-crank lever 22, so that said lever can only be thrust back the appropriate distance.

The different members of the set of interchangeable rate gears 2″ vary from each other in the ratio of one tooth, each representing five cents on the rate for a thousand feet, and usually but one gear will be provided for each meter at a time, another gear being provided and put to use when a change of rate is made.

The 1000-feet wheel and the main rate wheel which meshes therewith, each has sixty teeth so that the main rate wheel makes a single revolution for each thousand feet of gas. For convenience the coin wheel gear 8 is provided with twenty teeth, and therefore, in case the machine is constructed to be operated by twenty-five cent pieces, as shown in the drawings, each of the twenty teeth represents five cents, there being four quarter dollars discharged at each revolution of the coin wheel. The intermediate transmission gears 6, 7, are preferably provided with the same number of teeth as the coin wheel gear, and the ratio between the revolutions of the main rate gear 2 and the coin wheel is determined by the number of teeth in the rate changing gear 2″, each tooth in which, in the construction shown, represents five cents of the rate. If said rate changing gear has forty teeth, the rate is two dollars; if but twenty teeth, the rate is one dollar, and so on.

The coin-box is formed by the meter case 40 and the cover 39 and its door 43 and when said door 43 is swung into position shown in Fig. 10 a padlock, 65 may be inserted through the clasp and lug 45, 46, thus holding the door from swinging on the pivot 44. At the same time the catches 47 are caught in the slots 48, thus preventing the door from being pried off at the bottom. In order to open the coin-box the padlock will be removed and thereupon the door may be swung out of its closed position, thus giving access to the coin-box formed inside the cover.

To apply the attachment to a gas meter which is provided with the index movement indicated in Figs. 1, 2, 3, and 10, the latch 60 being open the gears 2, 2″ removed and the radius arm 4 swung back, the attachment frame is slid into place between the tongues 56, 57, 58, 59 on the index plate, and the latch 60 is turned into position to secure the attachment frame. Then the gears 2, 2″ and the screw 3 will be put into place, and the radius arm with gears 6, 7, 8, will be swung into position to cause gear 6 to mesh with gear 2″. Then the screw $f$ will be passed through the attachment frame $d$ and leg 51 and is screwed into the head 40 of the meter case. Then the cover 39 is applied over the index plate 55 and attachment frame $d$, and is brought into position with the slot of the bracket 49 on the stud 51 and the bracket 50 over the hollow leg 51′; and the door 43 being open, the locking screw 50′ is passed through the bracket 50 and the hollow leg 51′ and is screwed into the meter case head.

Then the door 43 will be closed and locked with the padlock 65, whereupon the prepay meter is ready for use.

In order to detach the prepaying attachment from the meter case it is only necessary to open the door 43 unscrew the screw 50′ whereupon the cover may be slid upward.

By releasing the latch the attachment frame may be withdrawn from the index frame, it being necessary, first, however, to free the rate gears 2, 2″ from the index movement and the attachment by unscrewing the screw 3 and swinging the radius arm 4 so as to allow the rate gears to be removed. On returning the attachment to the meter, the reverse operation will be performed.

In practical operation the device having been provided with a rate gear 2″ having the appropriate number of teeth to give the ratio for the determined rate, the consumer desiring to operate the meter will insert a coin, in this instance a twenty-five cent piece, in the orifice 17 and the coin will then pass down the chute 18, 18′ to the position shown in Fig. 1. The consumer will then turn the key 38 thus rotating the arm 35 to push the coin downward between contacts 19, 20, thereby wedging the bell-crank arm 22 in the direction of the arrow thereon, thus retracting the detent 26 from engagement with the tooth 27 and allowing the meter mechanism, not shown, to drive the coin-carrying wheel 9; said mechanism acting through the intermediate index train a, rate gears 2, 2″ and reversing gear wheels 6, 7, 8 so as to carry the coin downward during a quarter revolution of the coin-carrying wheel, which will continue to turn so long as gas is supplied to the meter and there is a coin between the coin seat 15 and the recessed wall 24 of the bell-crank limb 22.

When the actuating coin 16 escapes at the chute outlet 40′ and no other coin of the right denomination has been inserted in the device before the passage between the contacts 19, 20 has been contracted by retraction of the bell-crank limb 22 to the solid line position of Fig. 1, the detent will be moved into meter-stopping position for engagement with the tooth 27 as in dotted lines in Fig. 4, whereupon stoppage of the meter mechanism, not shown, is practically instantaneous and is in fact within a small fraction of one revolution of the two-feet wheel so that the pressure of the fluid furnished by the meter will remain uniform and the light or heat from the gas be full up to the moment of such stoppage.

The finger 66 formed on and bent over from the limb 22 embraces the edge of the attachment frame d thus to hold the limb against displacement from the face of the frame d, thus to allow free movement of the bell-crank on its axis and yet keep the walls of the chute extension 18.

I claim:—

1. The combination with meter index mechanism, of a locking device connected with the unit indicator shaft of said mechanism, means to actuate a coin to release the locking device, and mechanism operated by said index mechanism and adapted to act through a coin to hold the locking device in the released position.

2. The combination with a chute having an inlet; of a downward extension on said chute, a bell-crank forming a movable wall for said chute; index mechanism; locking mechanism controlled by said bell-crank, a wheel provided with arms and with recesses between the arms to accommodate a coin, the wheel being provided with detents to coöperate with the detent of the bell-crank to support a coin in the chute extension; means to force the coin past said detents thereby moving the bell-crank from locking position, and means operated by the index mechanism to move the wheel to advance the coin out of lever retracting position.

3. The combination with meter index mechanism, of a locking device connected with the unit indicator shaft of said mechanism, coin-controlled mechanism for releasing the locking device, and mechanism operated by said index mechanism and adapted to act through a coin to hold the locking device out of locking position.

4. The combination with meter index mechanism, of a recessed coin wheel, means to feed a coin to said coin wheel and to operate such coin to release the index mechanism, yielding means to retain such coin in such wheel to continue such release during rotation of the wheel, a stop connected with the index mechanism, a detent to engage the stop, means operated by the coin retainer to release the detent when the coin retainer is moved away from the coin wheel, and gearing connecting the index mechanism with the coin wheel to rotate said wheel to move the coin between the coin retainer and the coin wheel to hold the coin retainer away from the coin wheel.

5. A prepay attachment for gas meters comprising a frame adapted to be attached to a gas meter; mechanism carried by the frame to lock the index mechanism of the gas meter when said frame is attached to the gas meter; a coin carrier carried by said frame; means to feed a coin to said coin-carrier and to operate such coin to release the index mechanism; and to continue such release during a definite rotation of the coin carrier; mechanism adapted to connect the index mechanism and the coin carrier when the frame is attached to the gas meter; said coin carrier being adapted to hold a coin in position to release the locking mechanism and being operable by the index mechanism to carry the coin out of such position as the meter mechanism moves.

6. The combination with meter index mechanism, of a locking device connected with the unit indicator shaft of said mechanism, means acting through a coin to release the locking device, and means controlled by a coin and operated by said index mechanism to act through said coin to hold the locking device in the released position.

7. The combination with the unit indicator shaft of meter mechanism, of a latch operating to lock said shaft against turning, means operating against a coin to move a coin against the latch to retract said latch, and a device operating against said coin to hold the coin against the latch to hold the latch retracted, said device being operated by the meter mechanism to discharge the coin from its latch-retracting position.

8. The combination with meter mechanism, of a latch to lock said mechanism against operating, a coin-carrying wheel operatably connected to the meter mechanism, coin-supporting contacts on the latch and wheel respectively to support a coin when the latch is in locking position, and means to force the coin between said contacts to retract the latch.

9. The combination with meter mechanism, of a latch to lock said mechanism against operating, a coin-carrying wheel operatably connected to the meter mechanism and provided with a curved seat, coin-supporting contacts on the latch and wheel respectively to support a coin when the latch is in locking position, said latch forming an arc having its generating axis to coincide with the axis of the coin-carrying wheel and spaced apart from the wheel so that when the latch is retracted the distance between the latch and curved seat is equal to the diameter of the coin, and means to force the coin between said contacts and into the space between the curved seat and latch to retract the latch.

10. The combination with meter mechanism, of a wheel designed to move a coin around its axis and operated by said mechanism, a pivoted latch having a curved edge conforming to the periphery of the path of travel of the coin and connected to the meter mechanism to lock said mechanism, and spaced apart from the wheel so that when the latch is retracted the distance between the wheel and curved edge is equal to the diameter of the coin and so that when the latch is in locking position the distance between the wheel and curved edge is less than the diameter of the coin.

In testimony whereof, I have hereunto set my hand at Los Angeles, California, this 18th day of September, 1912.

ELIAS B. DE LA MATYR.

In presence of—
JAMES R. TOWNSEND,
L. BELLE RICE.

Copies of this patent may be obtained for five cents each, by addressing the "Commissioner of Patents, Washington, D. C."